(12) United States Patent
Hong

(10) Patent No.: US 12,280,652 B2
(45) Date of Patent: Apr. 22, 2025

(54) ELECTRIFIED VEHICLE POWER SYSTEM ARRANGEMENT

(71) Applicant: TOYOTA JIDOSHA KABUSHIKI KAISHA, Toyota (JP)

(72) Inventor: Zhicheng Hong, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 18/070,826

(22) Filed: Nov. 29, 2022

(65) Prior Publication Data

US 2023/0226899 A1 Jul. 20, 2023

(30) Foreign Application Priority Data

Jan. 18, 2022 (JP) .................. 2022-005911

(51) Int. Cl.
*B60K 1/04* (2019.01)
*B62D 21/15* (2006.01)
*B62D 25/08* (2006.01)

(52) U.S. Cl.
CPC .............. *B60K 1/04* (2013.01); *B62D 21/152* (2013.01); *B62D 25/085* (2013.01); *B60K 2001/0411* (2013.01)

(58) Field of Classification Search
CPC .... B60K 1/04; B60K 2001/0411; B60K 1/02; B62D 21/152; B62D 25/085
See application file for complete search history.

(56) References Cited

U.S. PATENT DOCUMENTS

2008/0078603 A1* 4/2008 Taji .................. H02K 5/00
180/312
2020/0283068 A1 9/2020 Murai

FOREIGN PATENT DOCUMENTS

| JP | 2012-096746 A | 5/2012 |
| JP | 2012-144142 | 8/2012 |
| JP | 2019-166918 A | 10/2019 |
| JP | 2020-142627 A | 9/2020 |
| JP | 2021-115893 A | 8/2021 |
| JP | 2021-115916 A | 8/2021 |

* cited by examiner

*Primary Examiner* — Jason D Shanske
*Assistant Examiner* — James J Triggs
(74) *Attorney, Agent, or Firm* — Oliff PLC

(57) ABSTRACT

The electrified vehicle includes a vehicle body, a plurality of wheels configured to support the vehicle body, a power unit attached to the vehicle body and configured to drive at least one of the plurality of wheels, and a high-voltage cable arranged in a vertical direction behind the power unit. The vehicle body is configured to support a lower portion of the power unit, and the upper portion of the power unit is configured to be connected to or engaged with the vehicle body via a bracket at least in a vehicle front-rear direction.

10 Claims, 5 Drawing Sheets

ELECTRIFIED VEHICLE POWER SYSTEM ARRANGEMENT

CROSS-REFERENCE TO RELATED APPLICATION

This application claims priority to Japanese Patent Application No. 2022-005911 filed on Jan. 18, 2022, incorporated herein by reference in its entirety.

BACKGROUND

1. Technical Field

The technology disclosed in the present specification relates to an electrified vehicle.

2. Description of Related Art

Japanese Unexamined Patent Application Publication No. 2020-142627 (JP 2020-142627 A) discloses a structure in which a power unit is mounted on an electrified vehicle. The power unit includes a motor and a power conversion device disposed on the motor and connected to the motor. The motor and the power conversion device are both attached to a vehicle body.

SUMMARY

In the above-described electrified vehicle, when the vehicle body supports a lower portion of the power unit, an upper portion of the power unit may rotate rearward about the supported lower portion when a collision load is applied in a vehicle front-rear direction. At this time, if a high-voltage cable is located behind the power unit, the high-voltage cable may be damaged due to contact with the power unit. The present specification provides a technique that can suppress the upper portion of the power unit from rotating rearward.

An electrified vehicle according to a first aspect of the present disclosure includes: a vehicle body; a plurality of wheels configured to support the vehicle body; a power unit mounted on the vehicle body and configured to drive at least one of the wheels; and a high-voltage cable arranged in a vertical direction behind the power unit. The vehicle body is configured to support a lower portion of the power unit. An upper portion of the power unit is configured to be connected to or engaged with the vehicle body via a bracket at least in a vehicle front-rear direction. Here, high voltage means a direct current (DC) voltage exceeding 60 volts or an alternating current (AC) voltage exceeding 30 volts (effective value).

In the above-described electrified vehicle, the upper portion of the power unit is connected to or engaged with the vehicle body via the bracket at least in the vehicle front-rear direction. According to this configuration, the upper portion of the power unit can be suppressed from rotating rearward at least temporarily when a collision load is applied in the vehicle front-rear direction.

In the electrified vehicle according to the first aspect, connection or engagement between the power unit and the vehicle body via the bracket may be configured to be released when a load of a predetermined value or more is applied in the vehicle front-rear direction. According to this configuration, transmission of an excessive collision load between the vehicle body and the power unit is suppressed, and unintended deformation and damage of the vehicle body and the power unit can be avoided.

In the electrified vehicle according to the first aspect, the vehicle body may include a cross member extending along a vehicle right-left direction. The cross member may be located above the power unit. Here, the upper portion of the power unit may be configured to be connected to or engaged with the cross member via the bracket.

In the electrified vehicle according to the first aspect, the bracket may be integrally provided with the power unit. In other embodiments, the bracket may be provided integrally with a part of the vehicle body, or may be provided separately from the vehicle body and the power unit.

In the electrified vehicle according to the first aspect, the power unit may include a driving motor configured to drive at least one of the wheels.

In the electrified vehicle according to the first aspect, the power unit may further include a power conversion device electrically connected to the driving motor.

In the electrified vehicle according to the first aspect, the electrified vehicle may further include an electrical unit located above the power unit and to which the high-voltage cable is connected. Here, the power unit may be configured to be electrically connected to the high-voltage cable via the electrical unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Figure 1:
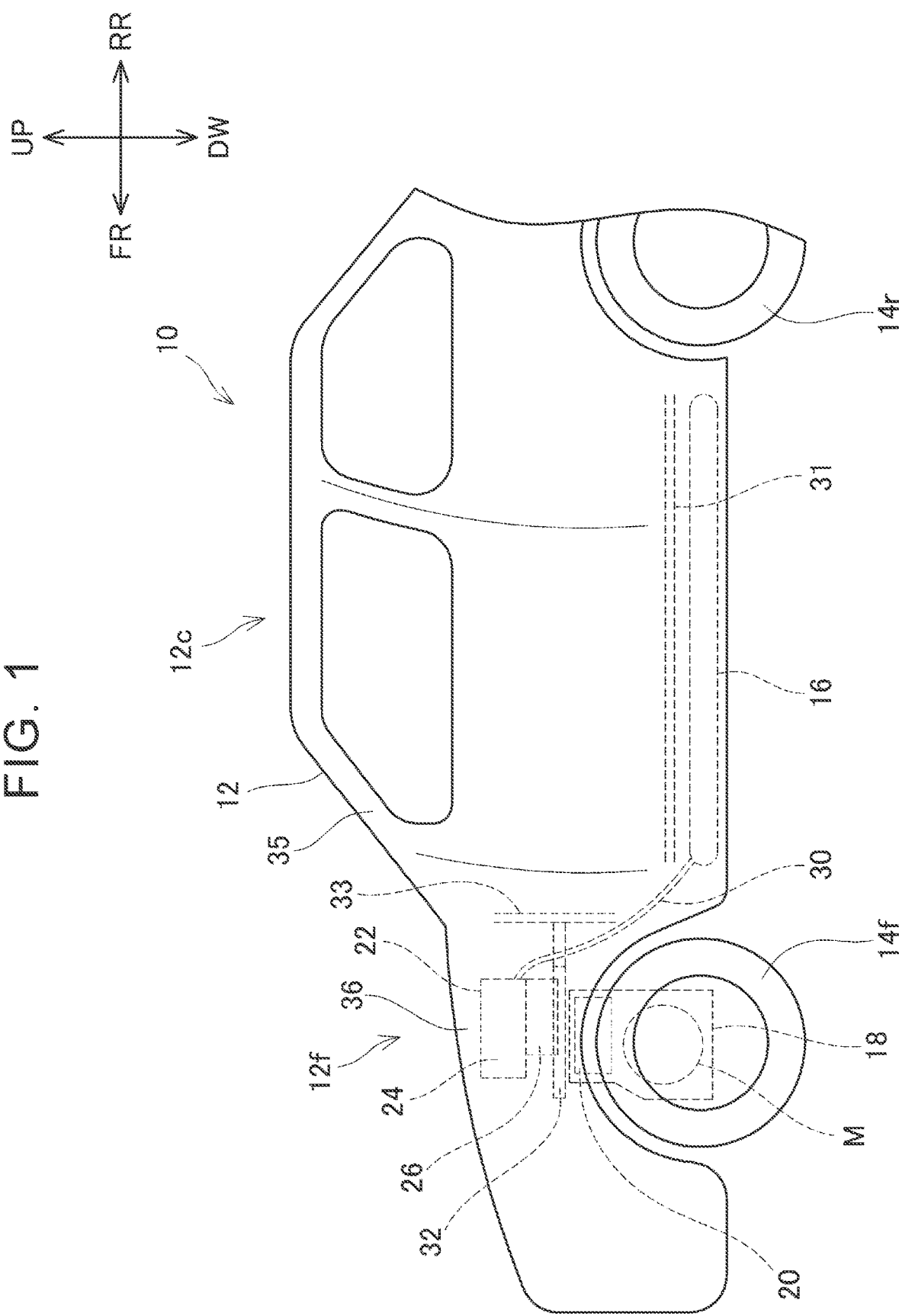
FIG. 1 is a diagram schematically illustrating a configuration of an electrified vehicle 10.
Figure 2:
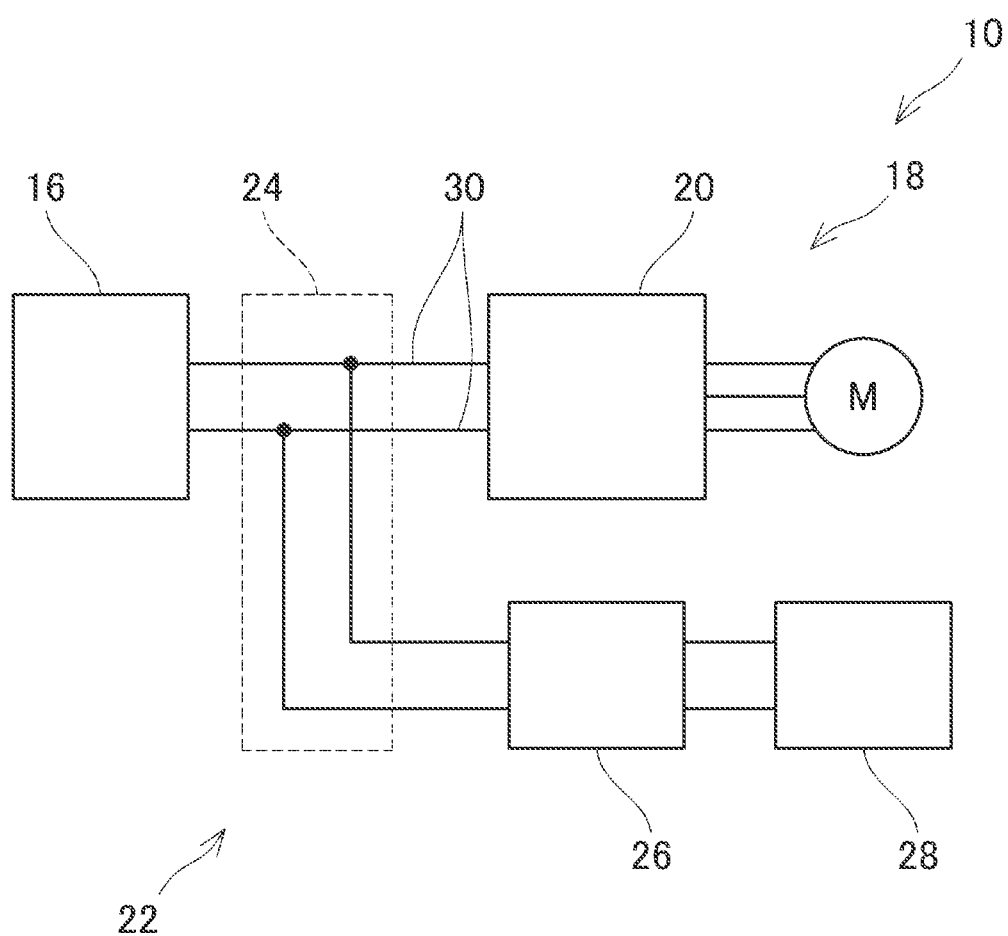
FIG. 2 is a block circuit diagram showing a configuration of the electrified vehicle 10.
Figure 3:
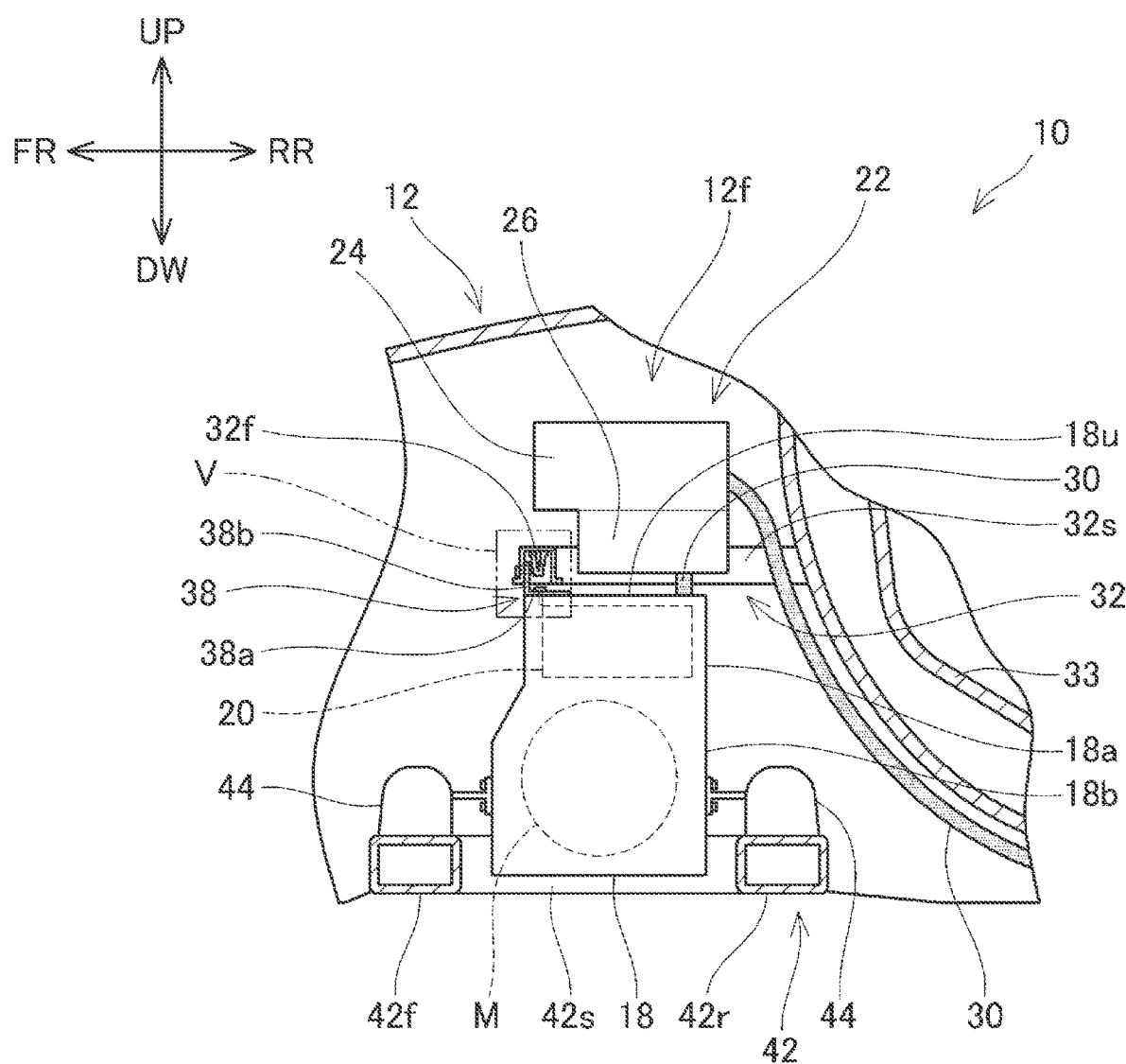
FIG. 3 is a diagram illustrating a configuration in the front compartment 12f of the electrified vehicle 10; Note that the side rails 42s located on the left side of the pair of side rails 42s of the suspension member 42 are not shown.

An electrified vehicle 10 according to an embodiment will be described with reference to the drawings. In one example, the electrified vehicle 10 is a fuel cell electrified vehicle. The electrified vehicle 10 is not limited to a fuel cell electric vehicle, and may be, for example, a vehicle having a driving motor such as a battery electric vehicle or a hybrid electric vehicle. As illustrated in FIGS. 1 to 3, the electrified vehicle 10 includes a vehicle body 12, a plurality of wheels 14f and 14r, a battery stack 16, a power unit 18, an electrical unit 22, and a high-voltage cable 30. The power unit 18 supplies electric power from the battery stack 16 for the electrified vehicle 10 to at least one of the plurality of wheels 14f and 14r. The high-voltage cable 30 is arranged in the vertical direction behind the power unit 18.

Here, the direction FR in the drawing indicates the front in the front-rear direction of the electrified vehicle 10, and the direction RR indicates the rear in the front-rear direction of the electrified vehicle 10. The direction LH indicates the left in the left-right direction (or the width direction) of the electrified vehicle 10, and the direction RH indicates the right in the left-right direction of the electrified vehicle 10. The direction UP indicates an upward direction in the up-down direction of the electrified vehicle 10, and the direction DW indicates a downward direction in the up-down direction of the electrified vehicle 10. In this specification, the front-rear direction of the electrified vehicle 10, the left-right direction of the electrified vehicle 10, and the up-down direction of the electrified vehicle 10 may be simply referred to as the front-rear direction, the left-right direction, and the up-down direction, respectively.

The vehicle body 12 is made of a metal such as, but not limited to, a steel material or an aluminum alloy. The plurality of wheels 14f and 14r includes a pair of front wheels 14f and a pair of rear wheels 14r. Each of the pair of front wheels 14f is located on the left and right sides of the vehicle body 12, and each of the pair of rear wheels 14r is located on the left and right sides of the vehicle body 12. The number of wheels 14f and 14r is not limited to four.

Figure 4:
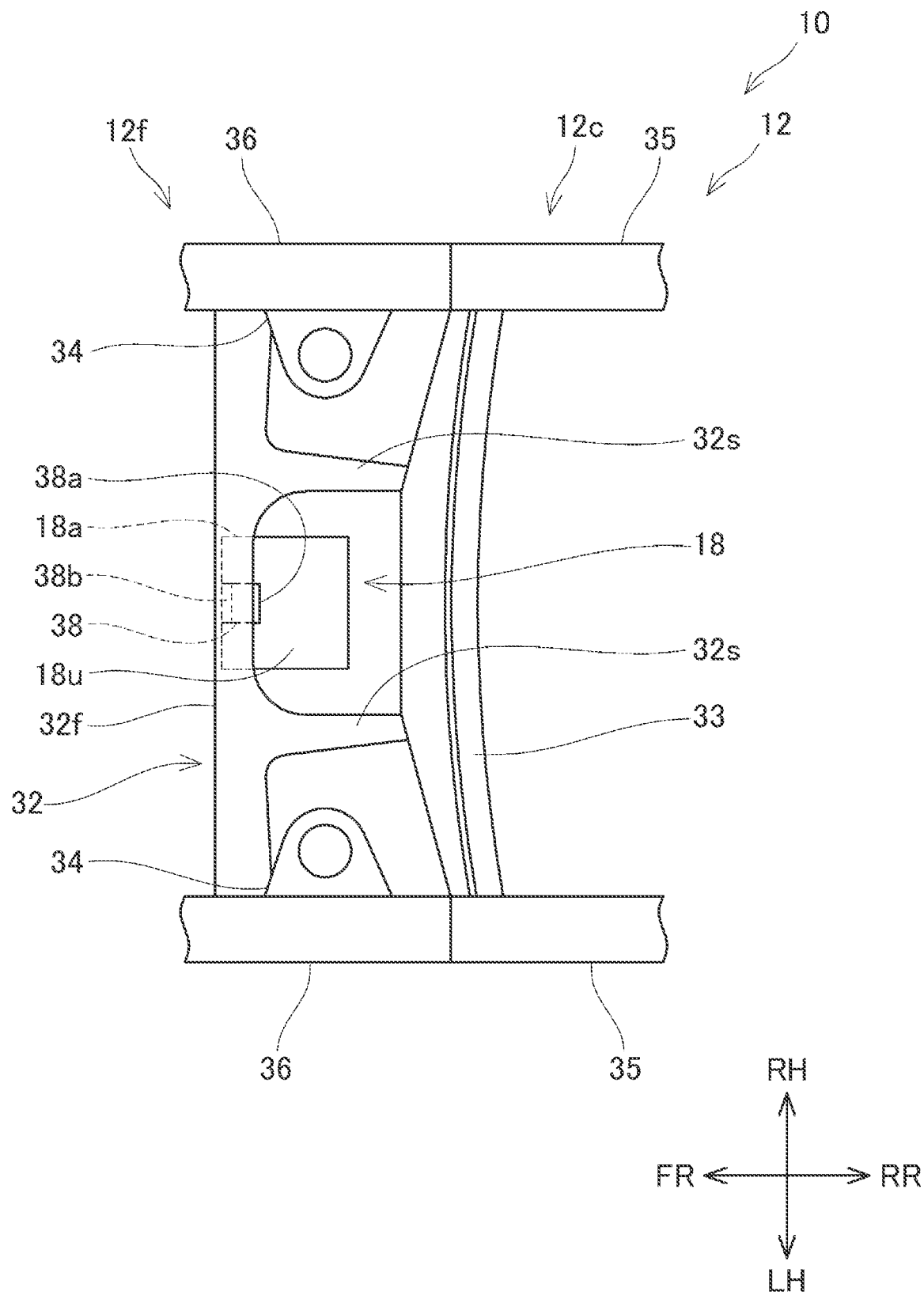
FIG. 4 is a plan view of the electrified vehicle 10 and shows a configuration of the power unit 18 and the reinforcing frame 32.

A cabin 12c and a front compartment 12f located in front of the cabin 12c are defined inside the vehicle body 12. The vehicle body 12 includes a floor panel 31, a dash panel 33, a pair of front pillars 35, and a pair of apron upper members 36. The floor panel 31 defines the floor of the cabin 12c. The cabin 12c is configured to allow a user to ride on the floor panel 31. The dash panel 33 is interposed between the cabin 12c and the front compartment 12f. The pair of front pillars 35 extends obliquely upward from the dash panel 33 toward the rear. The pair of apron upper members 36 extends forward from the pair of front pillars 35. A pair of suspension towers 34 illustrated in FIG. 4 is provided on the vehicle width direction inner side of the pair of apron upper members 36. The pair of suspension towers 34 holds an upper end portion of a suspension (not shown) that supports the pair of front wheels 14f.

A battery stack 16, a power unit 18, and an electrical unit 22 are disposed in the vehicle body 12. The battery stack 16 is disposed under the floor panel 31. The battery stack 16 is a secondary battery including a plurality of battery cells (not shown).

The power unit 18 and the electrical unit 22 are arranged in the front compartment 12f. The power unit 18 is attached to the vehicle body 12. The power unit 18 is electrically connected to the battery stack 16 via an electrical unit 22. The power unit 18 has an electromechanical integrated structure, and includes a motor M and a power conversion device 20 located above the motor M. The power conversion device 20 is electrically connected to the motor M. Therefore, the motor M is electrically connected to the battery stack 16 via the power conversion device 20. The power conversion device 20 converts the DC power from the battery stack 16 into AC power and supplies the AC power to the motor M. The power conversion device 20 includes, for example, a converter, an inverter, and the like. The converter is a DC-DC converter. The converter boosts the DC power from the battery stack 16 and supplies it to the inverter. The inverter is a three-phase AC inverter. The inverter converts the DC power boosted by the converter into three-phase AC power and supplies it to the motor M. The motor M drives at least a pair of wheels by using the electric power supplied from the power conversion device 20. In the present embodiment, the motor M drives the pair of front wheels 14f. Here, the motor M is an example of a "driving motor" in the technology disclosed in the present specification.

The electrical unit 22 is arranged above the power unit 18. The electrical unit 22 is electrically connected between the power unit 18 and the battery stack 16. The electrical unit 22 comprises a distributor 24 and a charger 26. The charger 26 is located below the distributor 24. The distributor 24 is electrically connected to the charger 26. The distributor 24 distributes the power of the battery stack 16 to the power unit 18, the charger 26, and the like.

The electrified vehicle 10 includes an auxiliary battery 28. The charger 26 is electrically connected to an auxiliary battery 28 (shown in FIG. 2). The charger 26 supplies charging power to the auxiliary battery 28. The auxiliary battery 28 is connected to various control systems and other auxiliary devices of the electrified vehicle 10, and supplies electric power thereto. The rated voltage of the auxiliary battery 28 is 12 volts. The charger 26 includes DC-DC converters. The charger 26 steps down the DC power from the battery stack 16 supplied via the distributor 24 and supplies the DC power to the auxiliary battery 28.

The battery stack 16, the power unit 18, and the electrical unit 22 described above are so-called high voltage components and are electrical components that operate at an AC voltage of greater than 30 volts or a DC voltage of greater than 60 volts. Between these high voltage components, i.e. between the battery stack 16, the power unit 18 and the electrical unit 22, are connected by means of a high-voltage cable 30. The auxiliary battery 28 and the charger 26 are connected by a low-voltage cable.

Here, the connection between the high-voltage components, that is, the battery stack 16, the power unit 18, and the electrical unit 22 will be described. The battery stack 16 and the electrical unit 22 are connected to each other by a high-voltage cable 30. The battery stack 16 is electrically connected to the electrical unit 22 via a high-voltage cable 30. The electrical unit 22 and the power unit 18 are connected to each other by a high-voltage cable 30. The electrical unit 22 is electrically connected to the power unit 18 via a high-voltage cable 30. Accordingly, the battery stack 16 is electrically connected to the power unit 18 via the high-voltage cable 30 and the electrical unit 22.

Figure 5:
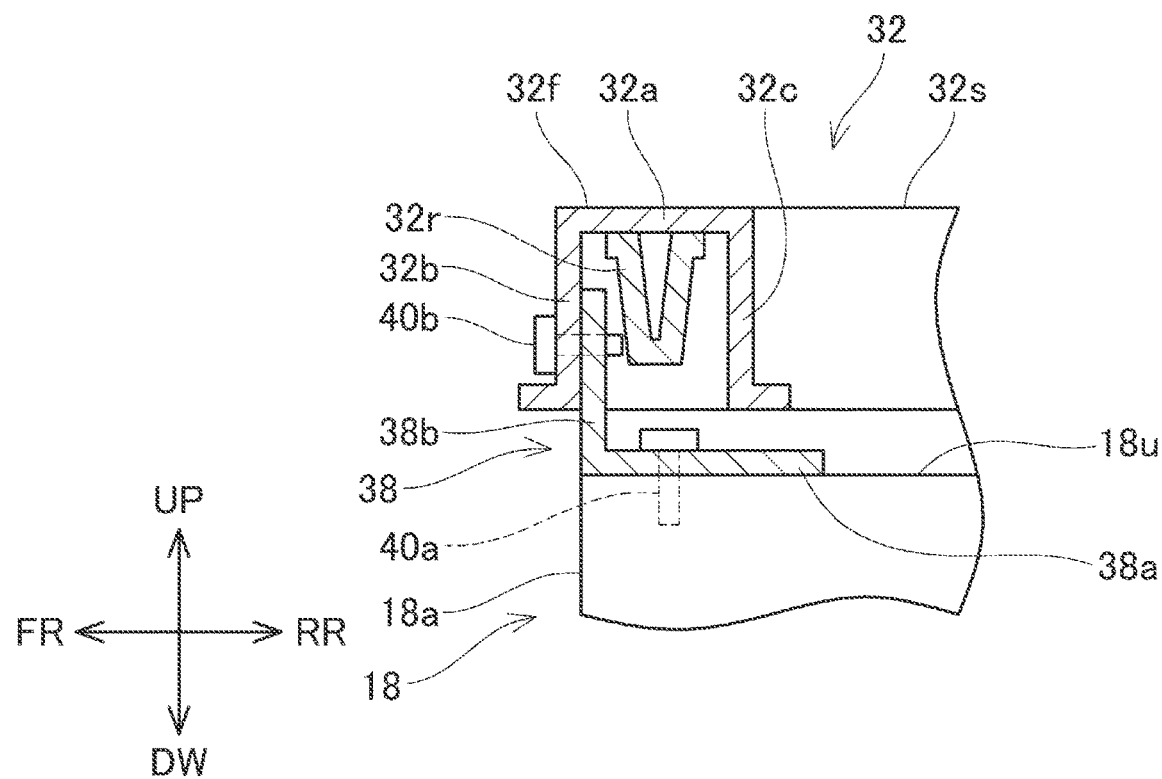
FIG. 5 is an enlarged view in part V of FIG. 3.

Referring to FIGS. 3 to 5, a support structure of the power unit 18 in the vehicle body 12 will be described. As shown in FIG. 3, the power unit 18 has an upper portion 18a and a lower portion 18b. The upper portion 18a is located above the center of gravity of the power unit 18, and the lower portion 18b is located below the center of gravity of the power unit 18. The lower portion 18b of the power unit 18 is supported by the vehicle body 12.

As illustrated in FIG. 3, the vehicle body 12 includes a suspension member 42 located in front of the dash panel 33 at a lower portion of the front compartment 12f. The suspension member 42 is arranged to partially surround the lower portion 18b of the power unit 18. The suspension member 42 includes a pair of cross members 42f and 42r extending in the left-right direction, and a pair of side rails 42s extending in the front-rear direction. The pair of cross members 42f and 42r includes a front cross member 42f and a rear cross member 42r. The power unit 18 is disposed between the pair of cross members 42f and 42r. A plurality of brackets 44 are provided in the pair of cross members 42f and 42r. The lower portion 18b of the power unit 18 is attached to the suspension member 42 via a plurality of brackets 44. The power unit 18 is supported on the suspension member 42 by a plurality of brackets 44. The number and position of the plurality of brackets 44 are not particularly limited. In the present embodiment, two brackets 44 are provided on the front cross member 42f, and one bracket 44 is provided on the rear cross member 42r.

On the other hand, a bracket 38 is provided on the upper surface 18u of the power unit 18. The upper portion 18a of the power unit 18 is connected to the vehicle body 12 via the bracket 38 at least in the front-rear direction. The bracket 38 is a bent flat plate-shaped member and has an L-shaped cross section. Here, the cross section refers to a cross section perpendicular to the left-right direction. The bracket 38 is located at the front end portion of the power unit 18 and extends along the left-right direction. The bracket 38 has a horizontal portion 38a and a vertical portion 38b extending perpendicularly to the horizontal portion 38a. The vertical portion 38b extends upward from the front end of the horizontal portion 38a. In the present embodiment, the bracket 38 is provided as a separate member from the power unit 18. The horizontal portion 38a of the bracket 38 is fixed to the upper surface 18u of the power unit 18 via a first fastener 40a such as a screw member.

As illustrated in FIGS. 3 and 4, the vehicle body 12 includes a reinforcing frame 32. The reinforcing frame 32 has a cross member 32f extending along the left-right direction and a pair of side rails 32s extending rearward from the cross member 32f. Both ends of the cross member 32f of the reinforcing frame 32 are respectively attached to the pair of apron upper members 36. The rear ends of the pair of side rails 32s of the reinforcing frame 32 are respectively attached to the dash panels 33. The cross member 32f of the reinforcing frame 32 is an example of a "cross member" in the technology disclosed in the present specification.

As shown in FIG. 5, a cross section of the cross member 32f of the reinforcing frame 32 has a hat shape. Here, the cross section refers to a cross section perpendicular to the left-right direction. The cross member 32f is formed of a bent plate member. The cross member 32f includes an upper plate portion 32a, a front plate portion 32b extending downward from the front end of the upper plate portion 32a, and a rear plate portion 32c extending downward from the rear end of the upper plate portion 32a. As an example, the rib 32r extending along the left-right direction is provided on the inner surface of the upper plate portion 32a. The rib 32r is formed by a bent plate member and has a V-shape. The rib 32r forms a closed cross section with the upper plate portion 32a. Thus, the rigidity of the cross member 32f is increased. A vertical portion 38b of the bracket 38 of the power unit 18 is interposed between the front plate portion 32b of the cross member 32f and the rib 32r. In the present embodiment, the bracket 38 of the power unit 18 is fixed to the front plate portion 32b of the cross member 32f via a second fastener 40b such as a screw member.

The configuration (position, number, shape, etc.) of the fasteners 40a and 40b that connect the bracket 38 to the power unit 18 and the reinforcing frame 32 is not particularly limited. At least one of the first fastener 40a and the second fastener 40b is configured such that the connection between the power unit 18 and the vehicle body 12 (that is, the reinforcing frame 32) by the bracket 38 is released when a load of a predetermined value or more is applied in the front-rear direction. As an example, at least one of the first fastener 40a and the second fastener 40b is formed to have a radial dimension such that the shaft portion thereof can be broken when a load of a predetermined value or more is applied in the front-rear direction. However, the means for disconnecting is not particularly limited. In other embodiments, at least one of the first fastener 40a and the second fastener 40b may have a slit in the shaft portion. Alternatively, instead of the fasteners 40a, 40b, the bracket 38 may have disconnection means.

As described above, in the electrified vehicle 10, when the vehicle body 12 supports the lower portion 18b of the power unit 18, when a collision load is applied in the vehicle front-rear direction, the upper portion 18a of the power unit 18 may rotate backward around the supported lower portion 18b. At this time, if the high-voltage cable 30 is located behind the power unit 18, the high-voltage cable 30 may be damaged due to contact with the power unit 18.

In order to solve the above problem, in the electrified vehicle 10 according to the present embodiment, the upper portion 18a of the power unit 18 is connected to the vehicle body 12 via the bracket 38 at least in the vehicle front-rear direction. According to such a configuration, it is possible to at least temporarily suppress the upper portion 18a of the power unit 18 from rotating backward when a collision load is applied in the vehicle front-rear direction.

Although described above, in the present embodiment, the connection between the power unit 18 and the vehicle body 12 by the bracket 38 is configured to be released when a load of a predetermined value or more is applied in the vehicle front-rear direction. According to such a configuration, transmission of a problematic collision load between the vehicle body 12 and the power unit 18 is suppressed, and unintended deformation and damage of the vehicle body 12 and the power unit 18 can be avoided.

(Modification)

Figure 6:
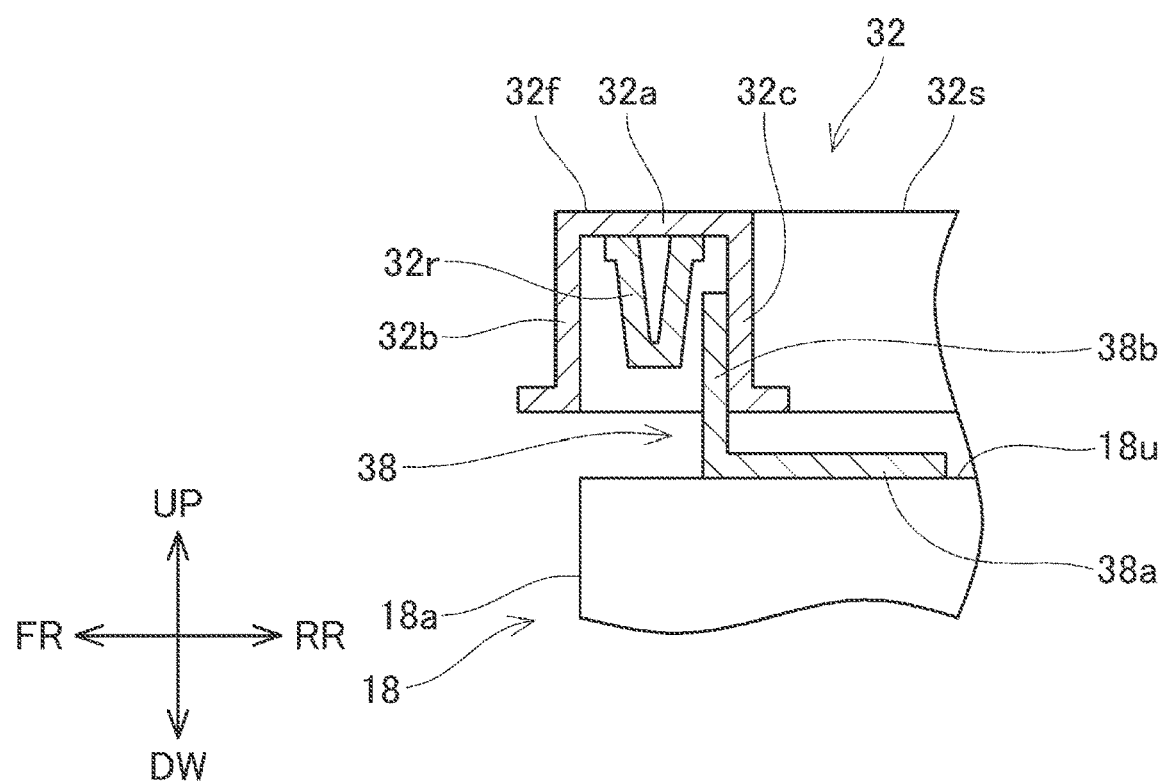
FIG. 6 is an end view illustrating a modification of the bracket 38.

A modified example of the bracket 38 will be described with reference to FIG. 6. As shown in FIG. 6, the bracket 38 is provided integrally with the power unit 18. Further, the bracket 38 is configured to engage between the power unit 18 and the vehicle body 12 in the front-rear direction. In these respects, the bracket 38 is modified to the configuration of the embodiment. As an example, the vertical portion 38b of the bracket 38 is interposed between the rib 32r of the reinforcing frame 32 and the rear plate portion 32c. The rear surface of the vertical portion 38b of the bracket 38 abuts against the rear plate portion 32c of the reinforcing frame 32. Also with such a configuration, it is possible to at least temporarily suppress the upper portion 18a of the power unit 18 from rotating backward when a collision load is applied in the vehicle front-rear direction Although the specific examples disclosed by the present disclosure have been described in detail above, these are merely examples and do not limit the scope of claims. The techniques described in the claims include various modifications and alternations of the specific examples illustrated above. The technical elements described in this specification or in the drawings may be used alone or in various combinations, and are not limited to the combinations described in the claims at the time of filing. The technology illustrated in the present specification or the drawings can achieve a plurality of objects at the same time, and has technical usefulness in achieving one of the objects.

What is claimed is:
1. An electrified vehicle comprising:
   a vehicle body;
   a plurality of wheels configured to support the vehicle body;
   a power unit mounted on the vehicle body and configured to drive at least one of the wheels, and including (i) a driving motor configured to drive at least one of the wheels and (ii) a power conversion device electrically connected to the driving motor;

a first cable through which a direct current with voltage exceeding 60 volts or an alternating current with voltage exceeding 30 volts flows, the first cable being arranged in a vertical direction behind the power unit;

a charger arranged above the power conversion device; and a second cable through which a direct current with voltage exceeding 60 volts or an alternating current with voltage exceeding 30 volts flows, the second cable connecting the power conversion device and the charger, wherein the vehicle body is configured to support a lower portion of the power unit, and an upper portion of the power unit is configured to be connected to or engaged with the vehicle body via a bracket at least in a vehicle front-rear direction.

2. The electrified vehicle according to claim 1, wherein connection or engagement between the power unit and the vehicle body via the bracket is configured to be released when a load of at least a predetermined value is applied in the vehicle front-rear direction.

3. The electrified vehicle according to claim 1, wherein
the vehicle body includes a cross member extending along a vehicle right-left direction and located above the power unit, and
the upper portion of the power unit is configured to be connected to or engaged with the cross member via the bracket.

4. The electrified vehicle according to claim 1, wherein the bracket is integrally provided with the power unit.

5. The electrified vehicle according to claim 1, wherein the power conversion device includes a DC-DC converter and a three-phase AC inverter.

6. The electrified vehicle according to claim 1, further comprising a distributor arranged above the charger, wherein
the first cable is connected to the distributor.

7. The electrified vehicle according to claim 6, wherein the vehicle body includes a floor panel,
the electrified vehicle includes a battery stack disposed under the floor panel,
the first cable connects the distributor and the battery stack, and
the distributor distributes a power of the battery stack to the power unit and the charger.

8. The electrified vehicle according to claim 7, further comprising an auxiliary battery, wherein
the charger supplies the power to the auxiliary battery.

9. The electrified vehicle according to claim 1, wherein
the vehicle body includes a reinforcing frame including a cross member,
the cross member includes an upper plate portion, a front plate portion extending downward from a front end of the upper plate portion, and a rear plate portion extending downward from a rear end of the upper plate portion,
the bracket includes a horizontal portion and a vertical portion extending perpendicularly to the horizontal portion,
the vertical portion of the bracket extends upward from a front end of the horizontal portion,
the horizontal portion of the bracket is fixed to an upper surface of the power unit via a first fastener, and
the vertical portion of the bracket is fixed to the front plate portion of the cross member via a second fastener.

10. The electrified vehicle according to claim 1, wherein
the vehicle body includes a reinforcing frame including a cross member,
the cross member includes an upper plate portion, a front plate portion extending downward from a front end of the upper plate portion, and a rear plate portion extending downward from a rear end of the upper plate portion,
the bracket includes a horizontal portion and a vertical portion extending perpendicularly to the horizontal portion,
the vertical portion extends upward from a front end of the horizontal portion, and
a rear surface of the vertical portion of the bracket abuts against the rear plate portion of the cross member.

* * * * *